United States Patent
Hulick, Jr. et al.

(10) Patent No.: US 12,323,409 B2
(45) Date of Patent: Jun. 3, 2025

(54) WEB TOKENS FOR ENHANCED MICROSERVICE OBSERVABILITY

(71) Applicant: Cisco Technology, Inc., San Jose, CA (US)

(72) Inventors: Walter Theodore Hulick, Jr., Pearland, TX (US); David John Zacks, Vancouver (CA); Thomas Szigeti, Vancouver (CA); Andrew Albert Pletcher, Scotts Valley, CA (US)

(73) Assignee: Cisco Technology, Inc., San Jose, CA (US)

( * ) Notice: Subject to any disclaimer, the term of this patent is extended or adjusted under 35 U.S.C. 154(b) by 348 days.

(21) Appl. No.: 17/535,950

(22) Filed: Nov. 26, 2021

(65) Prior Publication Data
US 2023/0171240 A1  Jun. 1, 2023

(51) Int. Cl.
*H04L 29/00* (2006.01)
*H04L 9/32* (2006.01)
*H04L 9/40* (2022.01)

(52) U.S. Cl.
CPC ........ *H04L 63/0823* (2013.01); *H04L 9/3213* (2013.01); *H04L 9/3263* (2013.01); *H04L 63/083* (2013.01)

(58) Field of Classification Search
CPC . H04L 63/0823; H04L 9/3213; H04L 9/3263; H04L 63/083; H04L 9/3247; H04L 63/0807
See application file for complete search history.

(56) References Cited

U.S. PATENT DOCUMENTS

| | | | |
|---|---|---|---|
| 9,473,304 B1* | 10/2016 | Dixon | H04L 67/01 |
| 10,263,787 B1 | 4/2019 | Gelman et al. | |
| 11,044,257 B1* | 6/2021 | Heuts | H04L 63/108 |
| 11,050,848 B2 | 6/2021 | Nucci et al. | |
| 11,265,324 B2* | 3/2022 | Felice-Steele | G06F 16/13 |
| 11,582,036 B1* | 2/2023 | Chen | H04L 9/088 |
| 11,595,378 B2* | 2/2023 | Liu | H04W 12/06 |
| 2016/0239771 A1* | 8/2016 | Gukal | G06Q 10/0635 |
| 2017/0070500 A1* | 3/2017 | Hockey | H04L 9/3228 |
| 2017/0132431 A1* | 5/2017 | Gonzalez Blanco | H04L 63/0838 |

(Continued)

OTHER PUBLICATIONS

"Introduction to JSON Web Tokens", online: https://jwt.io/introduction, accessed Jul. 14, 2021, 11 pages, JWT.IO.

(Continued)

*Primary Examiner* — Don G Zhao
(74) *Attorney, Agent, or Firm* — BEHMKE INNOVATION GROUP LLC; James M. Behmke; James J. Wong

(57) ABSTRACT

In one embodiment, a service determines authentication credentials for a web application transaction. The service determines one or more performance metrics regarding the web application transaction. The service generates an enhanced web token comprising the one or more performance metrics regarding the web application transaction. The service sends the enhanced web token and the authentication credentials along a path of the web application transaction, the path including one or more services configured to use the one or more performance metrics sent in addition to the authentication credentials to process the web application transaction.

12 Claims, 8 Drawing Sheets

(56) References Cited

U.S. PATENT DOCUMENTS

| | | | |
|---|---|---|---|
| 2017/0330190 A1* | 11/2017 | Kohli | G06Q 20/34 |
| 2018/0088935 A1 | 3/2018 | Church et al. | |
| 2018/0158052 A1* | 6/2018 | Tseretopoulos | G06Q 20/38215 |
| 2019/0114631 A1* | 4/2019 | Madhu | H04L 9/3247 |
| 2019/0238517 A1* | 8/2019 | D'Agostino | G06Q 20/401 |
| 2019/0238518 A1* | 8/2019 | Wu | H04L 63/083 |
| 2019/0318122 A1* | 10/2019 | Hockey | G06Q 20/3221 |
| 2019/0386831 A1* | 12/2019 | Jamkhedkar | H04L 9/3213 |
| 2020/0045131 A1 | 2/2020 | Nigam et al. | |
| 2020/0067907 A1* | 2/2020 | Avetisov | H04L 63/12 |
| 2020/0099589 A1 | 3/2020 | Sethi et al. | |
| 2020/0351660 A1* | 11/2020 | Avetisov | H04L 63/062 |
| 2020/0380503 A1* | 12/2020 | Prokop | G06Q 20/3823 |
| 2020/0412538 A1* | 12/2020 | Rosado | H04L 63/126 |
| 2021/0044976 A1* | 2/2021 | Avetisov | G06F 21/64 |
| 2021/0328982 A1* | 10/2021 | Praszczalek | H04L 9/3231 |
| 2021/0374735 A1* | 12/2021 | Knox | G06Q 20/3674 |
| 2022/0035574 A1* | 2/2022 | Cain | G06F 3/0613 |
| 2022/0086133 A1* | 3/2022 | Killoran, Jr. | H04L 51/18 |
| 2022/0108309 A1* | 4/2022 | Hosp | G06Q 20/3263 |
| 2022/0124005 A1* | 4/2022 | Doshi | H04L 47/83 |
| 2022/0150066 A1* | 5/2022 | Sugarev | H04L 9/30 |
| 2022/0239640 A1* | 7/2022 | Wang | H04L 63/10 |
| 2022/0292500 A1* | 9/2022 | Ward | G06Q 20/38215 |
| 2022/0413992 A1* | 12/2022 | Nguyen | G06F 11/3428 |
| 2022/0417113 A1* | 12/2022 | Lohiya | H04L 41/5054 |
| 2023/0042508 A1* | 2/2023 | Agarwal | H04L 9/3247 |
| 2023/0102525 A1* | 3/2023 | Nagao | H04L 9/0891 705/51 |
| 2023/0199497 A1* | 6/2023 | Krishan | H04L 63/0281 726/12 |

OTHER PUBLICATIONS

"JSON Web Token Claims", online: https://auth0.com/docs/tokens/json-web-tokens/json-web-token-claims, accessed Jul. 14, 2021, 6 pages, Auth0, Inc.

Burcea, Catalin, "How to Read PEM File to Get Public and Private Keys", online: https://www.baeldung.com/java-read-pem-file-keys, Jun. 12, 2021, accessed Jul. 14, 2021, 12, Baeldung.com.

"WSO2 IS Tutorial: How to use JWT Tokens to exchange data", online: https://www.chakray.com/wso2-api-jwt-tokens-to-exchange-data/, accessed Jul. 14, 2021, 14 pages, Chakray.com.

* cited by examiner

TCP Segment Header

| Offsets | Octet | 0 | | | | | | | | 1 | | | | | | | | 2 | | | | | | | | 3 | | | | | | | |
|---|---|---|---|---|---|---|---|---|---|---|---|---|---|---|---|---|---|---|---|---|---|---|---|---|---|---|---|---|---|---|---|---|
| Octet | Bit | 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 |
| 0 | 0 | Source port ||||||||||||||||| Destination port |||||||||||||||||
| 4 | 32 | Sequence number |||||||||||||||||||||||||||||||||
| 8 | 64 | Acknowledgement number (if ACK set) |||||||||||||||||||||||||||||||||
| 12 | 96 | Data offset |||| Reserved 000 ||| N S | C W R | E C E | U R G | A C K | P S H | R S T | S Y N | F I N | Window Size |||||||||||||||
| 16 | 128 | Checksum ||||||||||||||||| Urgent pointer (if URG set) |||||||||||||||||
| 20 ... | 160 ... | Options (if data offset > 5. Padded at the end with "0" bytes if necessary.) |||||||||||||||||||||||||||||||||
| 60 | 480 | |||||||||||||||||||||||||||||||||

WEB TOKENS FOR ENHANCED MICROSERVICE OBSERVABILITY

TECHNICAL FIELD

The present disclosure relates generally to computer systems, and, more particularly, to web tokens for enhanced microservice observability.

BACKGROUND

The Internet and the World Wide Web have enabled the proliferation of web services available for virtually all types of businesses. Due to the accompanying complexity of the infrastructure supporting the web services, it is becoming increasingly difficult to maintain the highest level of service performance and user experience to keep up with the increase in web services. For example, it can be challenging to piece together monitoring and logging data across disparate systems, tools, and layers in a network architecture. Moreover, even when data can be obtained, it is difficult to directly connect the chain of events and cause and effect.

In particular, individual web services are increasingly being offered by microservices, which are, oftentimes, maintained and operated by organizations that are distinct from web application operators. For example, a microservice may provide payment processing or product/service tracking for a web application. In another example, a microservice may provide file/data access or comment posting for a social media application. Therefore, due to the separation of microservices and particular web applications, it has become even more difficult to connect the chain of events and cause and effect.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 6 illustrates an example transmission control protocol (TCP) header that includes JWT-derived information.

DESCRIPTION OF EXAMPLE EMBODIMENTS

Overview

Figure 1:
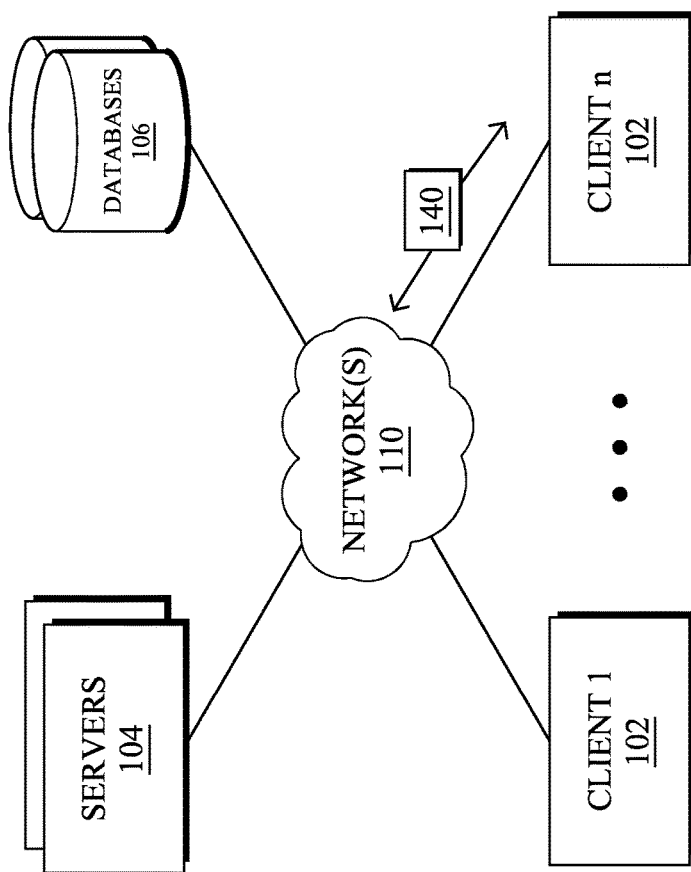
FIG. 1 illustrates an example computer network.

According to one or more embodiments of the disclosure, a service determines authentication credentials for a web application transaction, and also determines one or more performance metrics regarding the web application transaction. The service then generates an enhanced web token comprising the one or more performance metrics regarding the web application transaction. The service sends the enhanced web token and the authentication credentials along a path of the web application transaction, the path including one or more services configured to use the one or more performance metrics sent in addition to the authentication credentials to process the web application transaction.

In one or more other embodiments, a process receives a message regarding a web application transaction, where the message comprises an enhanced web token. The process then extracts one or more performance metrics regarding the web application transaction from the enhanced web token. The process may extract, when the enhanced web token comprises authentication information regarding the web application transaction, the authentication information from the enhanced web token. Alternatively, the process may extract, when the enhanced web token does not comprise the authentication information regarding the web application transaction, the authentication information regarding the web application transaction from another web token. The process then performs a service for the web application transaction based on the one or more performance metrics.

Other embodiments are described below, and this overview is not meant to limit the scope of the present disclosure.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

FIG. 1 is a schematic block diagram of an example (simplified) computing system 100 illustratively comprising any number of client devices 102 (e.g., a first through nth client device), one or more servers 104, and one or more databases 106, where the devices may be in communication with one another via one or more networks 110. The one or more networks 110 may include, as would be appreciated, any number of specialized networking devices such as routers, switches, access points, etc., interconnected via wired and/or wireless connections. For example, client devices 102 and/or the intermediary devices in one or more networks 110 may communicate wirelessly via links based on WiFi, cellular, infrared, radio, near-field communication, satellite, or the like. Other such connections may use hardwired links, e.g., Ethernet, fiber optic, etc. The nodes/devices typically communicate over the network by exchanging discrete frames or packets of data (packets 140) according to predefined protocols, such as the Transmission Control Protocol/Internet Protocol (TCP/IP) other suitable data structures, protocols, and/or signals. In this context, a protocol consists of a set of rules defining how the nodes interact with each other.

Client devices 102 may include any number of user devices or end point devices configured to interface with the techniques herein. For example, client devices 102 may include, but are not limited to, desktop computers, laptop computers, tablet devices, smart phones, wearable devices (e.g., heads up devices, smart watches, etc.), set-top devices, smart televisions, Internet of Things (IoT) devices, autonomous devices, or any other form of computing device capable of participating with other devices via one or more networks 110.

Notably, in some embodiments, one or more servers 104 and/or one or more databases 106, including any number of other suitable devices (e.g., firewalls, gateways, and so on) may be part of a cloud-based service. In such cases, the servers and/or one or more databases 106 may represent the cloud-based device(s) that provide certain services described herein, and may be distributed, localized (e.g., on the premise of an enterprise, or "on prem"), or any combination of suitable configurations, as will be understood in the art.

Those skilled in the art will also understand that any number of nodes, devices, links, etc. may be used in computing system 100, and that the view shown herein is for simplicity. Also, those skilled in the art will further understand that while the network is shown in a certain orientation, the computing system 100 is merely an example illustration that is not meant to limit the disclosure.

Notably, web services can be used to provide communications between electronic and/or computing devices over a network, such as the Internet. A web site is an example of a type of web service. A web site is typically a set of related web pages that can be served from a web domain. A web site can be hosted on a web server. A publicly accessible web site can generally be accessed via a network, such as the Internet. The publicly accessible collection of web sites is generally referred to as the World Wide Web (WWW).

Also, cloud computing generally refers to the use of computing resources (e.g., hardware and software) that are delivered as a service over a network (e.g., typically, the Internet). Cloud computing includes using remote services to provide a user's data, software, and computation.

Moreover, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a Software as a Service (SaaS) over a network, such as the Internet.

Figure 2:
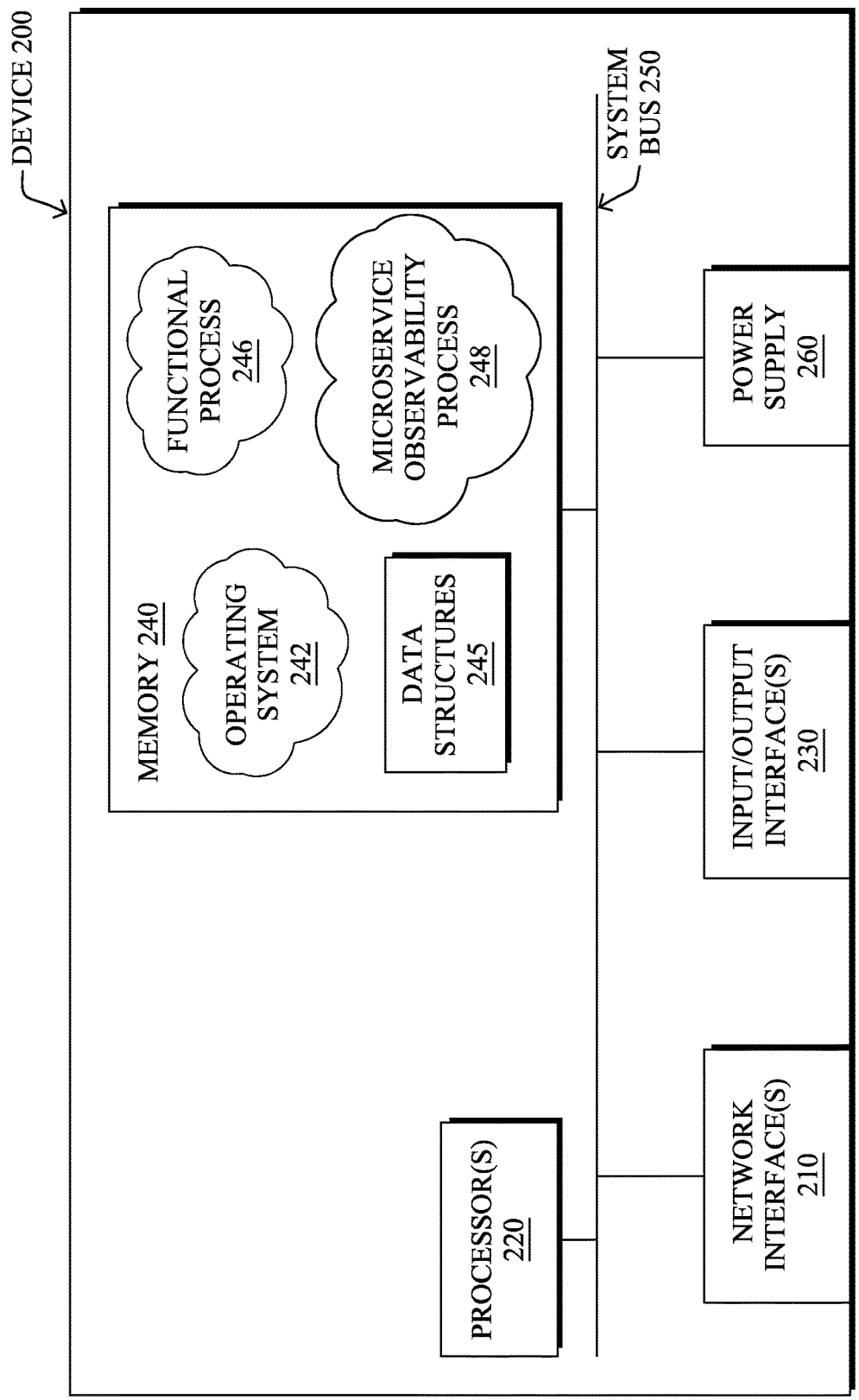
FIG. 2 illustrates an example computing device/node.

FIG. 2 is a schematic block diagram of an example node/device 200 that may be used with one or more embodiments described herein, e.g., as any of the client devices 102, one or more servers 104, one or more databases 106 shown in FIG. 1 above. Device 200 may comprise one or more network interfaces 210 (e.g., wired, wireless, etc.), at processor(s) 220, and a memory 240 interconnected by a system bus 250, as well as a power supply 260 (e.g., battery, plug-in, etc.).

One or more network interfaces 210 contain the mechanical, electrical, and signaling circuitry for communicating data over links coupled to the one or more networks 110. The network interfaces may be configured to transmit and/or receive data using a variety of different communication protocols. Note, further, that device 200 may have multiple types of network connections via one or more network interfaces 210, e.g., wireless and wired/physical connections, and that the view herein is merely for illustration.

Depending on the type of device, other interfaces, such as input/output (I/O) interfaces 230, user interfaces (UIs), and so on, may also be present on the device. Input devices, in particular, may include an alpha-numeric keypad (e.g., a keyboard) for inputting alpha-numeric and other information, a pointing device (e.g., a mouse, a trackball, stylus, or cursor direction keys), a touchscreen, a microphone, a camera, and so on. Additionally, output devices may include speakers, printers, particular network interfaces, monitors, etc.

The memory 240 comprises a plurality of storage locations that are addressable by the processor(s) 220 and the one or more network interfaces 210 for storing software programs and data structures associated with the embodiments described herein. The processor(s) 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise one or more functional processes 246, and on certain devices, microservice observability process 248, as described herein. Notably, one or more functional processes 246, when executed by processor(s) 220, cause each device 200 to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

——Observability Intelligence Platform——

As noted above, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a software as a service (SaaS) over a network, such as the Internet. As an example, a distributed application can be implemented as a SaaS-based web service available via a web site that can be accessed via the Internet. As another example, a distributed application can be implemented using a cloud provider to deliver a cloud-based service.

Users typically access cloud-based/web-based services (e.g., distributed applications accessible via the Internet) through a web browser, a light-weight desktop, and/or a mobile application (e.g., mobile app) while the enterprise software and user's data are typically stored on servers at a remote location. For example, using cloud-based/web-based services can allow enterprises to get their applications up and running faster, with improved manageability and less maintenance, and can enable enterprise IT to more rapidly adjust resources to meet fluctuating and unpredictable business demand. Thus, using cloud-based/web-based services can allow a business to reduce Information Technology (IT) operational costs by outsourcing hardware and software maintenance and support to the cloud provider.

However, a significant drawback of cloud-based/web-based services (e.g., distributed applications and SaaS-based solutions available as web services via web sites and/or using other cloud-based implementations of distributed applications) is that troubleshooting performance problems can be very challenging and time consuming. For example, determining whether performance problems are the result of the cloud-based/web-based service provider, the customer's own internal IT network (e.g., the customer's enterprise IT network), a user's client device, and/or intermediate network providers between the user's client device/internal IT network and the cloud-based/web-based service provider of a distributed application and/or web site (e.g., in the Internet) can present significant technical challenges for detection of such networking related performance problems and determining the locations and/or root causes of such networking related performance problems. Additionally, determining whether performance problems are caused by the network or an application itself, or portions of an application, or particular services associated with an application, and so on, further complicate the troubleshooting efforts.

Certain aspects of one or more embodiments herein may thus be based on (or otherwise relate to or utilize) an observability intelligence platform for network and/or application performance management. For instance, solutions are available that allow customers to monitor networks and applications, whether the customers control such networks and applications, or merely use them, where visibility into such resources may generally be based on a suite of "agents" or pieces of software that are installed in different locations in different networks (e.g., around the world).

Specifically, as discussed with respect to illustrative FIG. 3 below, performance within any networking environment may be monitored, specifically by monitoring applications and entities (e.g., transactions, tiers, nodes, and machines) in the networking environment using agents installed at individual machines at the entities. As an example, applications may be configured to run on one or more machines (e.g., a customer will typically run one or more nodes on a machine, where an application consists of one or more tiers, and a tier consists of one or more nodes). The agents collect data associated with the applications of interest and associated nodes and machines where the applications are being operated. Examples of the collected data may include performance data (e.g., metrics, metadata, etc.) and topology data (e.g., indicating relationship information), among other configured information. The agent-collected data may then be provided to one or more servers or controllers to analyze the data.

Examples of different agents (in terms of location) may comprise cloud agents (e.g., deployed and maintained by the observability intelligence platform provider), enterprise agents (e.g., installed and operated in a customer's network), and endpoint agents, which may be a different version of the previous agents that is installed on actual users' (e.g., employees') devices (e.g., on their web browsers or otherwise). Other agents may specifically be based on categorical configurations of different agent operations, such as language agents (e.g., Java agents, .Net agents, PHP agents, and others), machine agents (e.g., infrastructure agents residing on the host and collecting information regarding the machine which implements the host such as processor usage, memory usage, and other hardware information), and network agents (e.g., to capture network information, such as data collected from a socket, etc.).

Each of the agents may then instrument (e.g., passively monitor activities) and/or run tests (e.g., actively create events to monitor) from their respective devices, allowing a customer to customize from a suite of tests against different networks and applications or any resource that they're interested in having visibility into, whether it's visibility into that end point resource or anything in between, e.g., how a device is specifically connected through a network to an end resource (e.g., full visibility at various layers), how a website is loading, how an application is performing, how a particular business transaction (or a particular type of business transaction) is being effected, and so on, whether for individual devices, a category of devices (e.g., type, location, capabilities, etc.), or any other suitable embodiment of categorical classification.

Figure 3:
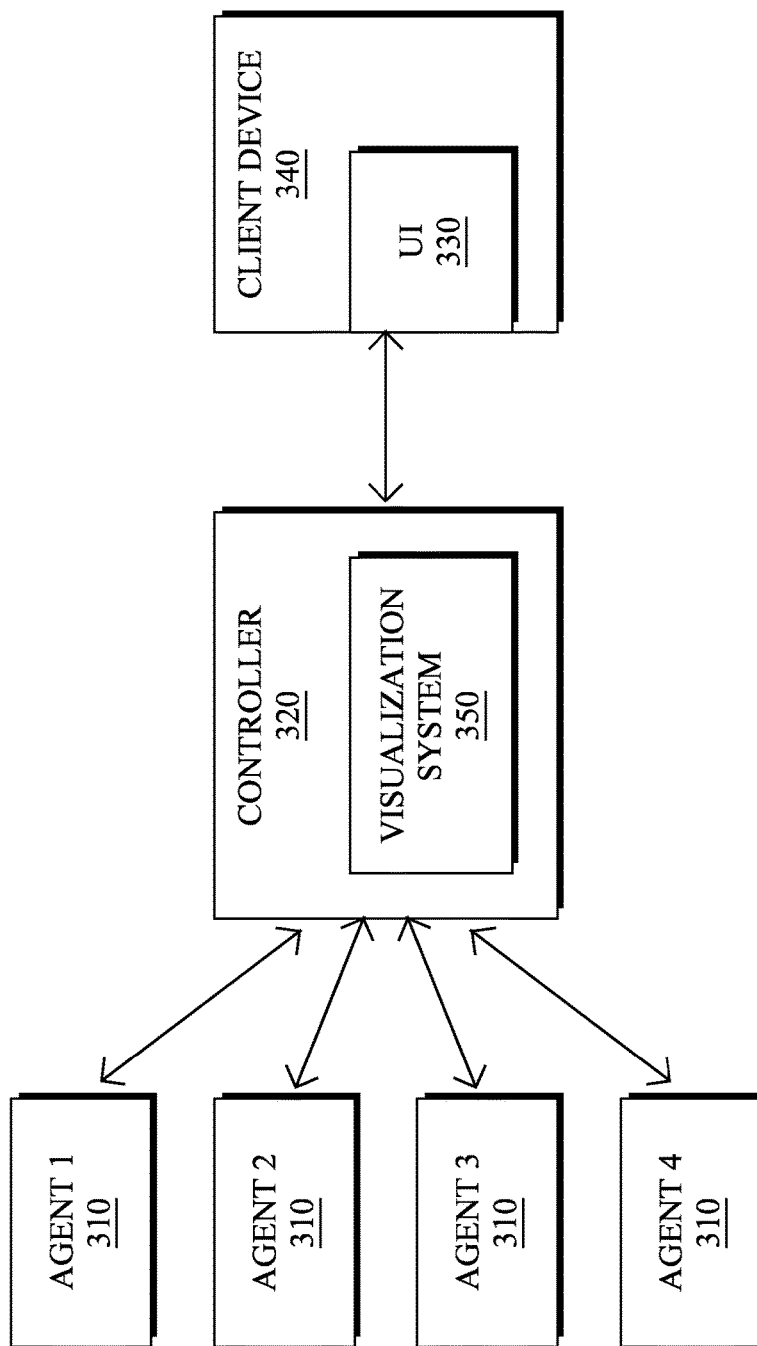
FIG. 3 illustrates an example observability intelligence platform.

FIG. 3 is a block diagram of an example observability intelligence platform 300 that can implement one or more aspects of the techniques herein. The observability intelligence platform is a system that monitors and collects metrics of performance data for a network and/or application environment being monitored. At the simplest structure, the observability intelligence platform includes one or more agents 310 and one or more servers or controllers 320. Agents may be installed on network browsers, devices, servers, etc., and may be executed to monitor the associated device and/or application, the operating system of a client, and any other application, API, or another component of the associated device and/or application, and to communicate with (e.g., report data and/or metrics to) the controllers 320 as directed. Note that while FIG. 3 shows four agents (e.g., Agent 1 through Agent 4) communicatively linked to a single controller, the total number of agents and controllers can vary based on a number of factors including the number of networks and/or applications monitored, how distributed the network and/or application environment is, the level of monitoring desired, the type of monitoring desired, the level of user experience desired, and so on.

For example, instrumenting an application with agents may allow a controller to monitor performance of the application to determine such things as device metrics (e.g., type, configuration, resource utilization, etc.), network browser navigation timing metrics, browser cookies, application calls and associated pathways and delays, other aspects of code execution, etc. Moreover, if a customer uses agents to run tests, probe packets may be configured to be sent from agents to travel through the Internet, go through many different networks, and so on, such that the monitoring solution gathers all of the associated data (e.g., from returned packets, responses, and so on, or, particularly, a lack thereof). Illustratively, different "active" tests may comprise HTTP tests (e.g., using curl to connect to a server and load the main document served at the target), Page Load tests (e.g., using a browser to load a full page—i.e., the main document along with all other components that are included in the page), or Transaction tests (e.g., same as a Page Load, but also performing multiple tasks/steps within the page— e.g., load a shopping website, log in, search for an item, add it to the shopping cart, etc.).

The controllers 320 is the central processing and administration server for the observability intelligence platform. The controllers 320 may serve a browser-based user interface (UI) 330 that is the primary interface for monitoring, analyzing, and troubleshooting the monitored environment. Specifically, the controllers 320 can receive data from one or more agents 310 (and/or other coordinator devices), associate portions of data (e.g., topology, business transaction end-to-end paths and/or metrics, etc.), communicate with agents to configure collection of the data (e.g., the instrumentation/tests to execute), and provide performance data and reporting through the interface 330. The interface 330 may be viewed as a web-based interface viewable by a client device 340. In some implementations, a client device 340 can directly communicate with controllers 320 to view an interface for monitoring data. The controllers 320 can include a visualization system 350 for displaying the reports and dashboards related to the disclosed technology. In some implementations, the visualization system 350 can be implemented in a separate machine (e.g., a server) different from the one hosting the controllers 320.

Notably, in an illustrative Software as a Service (SaaS) implementation, a controller instance of controllers 320 may be hosted remotely by a provider of the observability intelligence platform 300. In an illustrative on-premises (On-Prem) implementation, a controller instance of controllers 320 may be installed locally and self-administered.

The controllers 320 receive data from one or more agents 310 (e.g., Agents 1-4) deployed to monitor networks, applications, databases and database servers, servers, and end user clients for the monitored environment. Any of one or more agents 310 can be implemented as different types of agents with specific monitoring duties. For example, application agents may be installed on each server that hosts applications to be monitored. Instrumenting an agent adds an application agent into the runtime process of the application.

Database agents, for example, may be software (e.g., a Java program) installed on a machine that has network access to the monitored databases and the controller. Standalone machine agents, on the other hand, may be standalone programs (e.g., standalone Java programs) that collect hardware-related performance statistics from the servers (or other suitable devices) in the monitored environment. The standalone machine agents can be deployed on machines that host application servers, database servers, messaging servers, Web servers, etc. Furthermore, end user monitoring (EUM) may be performed using browser agents and mobile agents to provide performance information from the point of view of the client, such as a web browser or a mobile native application. Through EUM, web use, mobile use, or combinations thereof (e.g., by real users or synthetic agents) can be monitored based on the monitoring needs.

Note that monitoring through browser agents and mobile agents are generally unlike monitoring through application agents, database agents, and standalone machine agents that are on the server. In particular, browser agents may generally be embodied as small files using web-based technologies, such as JavaScript agents injected into each instrumented web page (e.g., as close to the top as possible) as the web page is served, and are configured to collect data. Once the web page has completed loading, the collected data may be bundled into a beacon and sent to an EUM process/cloud for processing and made ready for retrieval by the controller. Browser real user monitoring (Browser RUM) provides insights into the performance of a web application from the point of view of a real or synthetic end user. For example, Browser RUM can determine how specific Ajax or iframe calls are slowing down page load time and how server performance impact end user experience in aggregate or in individual cases. A mobile agent, on the other hand, may be a small piece of highly performant code that gets added to the source of the mobile application. Mobile RUM provides information on the native mobile application (e.g., iOS or Android applications) as the end users actually use the mobile application. Mobile RUM provides visibility into the functioning of the mobile application itself and the mobile application's interaction with the network used and any server-side applications with which the mobile application communicates.

Note further that in certain embodiments, in the application intelligence model, a business transaction represents a particular service provided by the monitored environment. For example, in an e-commerce application, particular real-world services can include a user logging in, searching for items, or adding items to the cart. In a content portal, particular real-world services can include user requests for content such as sports, business, or entertainment news. In a stock trading application, particular real-world services can include operations such as receiving a stock quote, buying, or selling stocks.

A business transaction, in particular, is a representation of the particular service provided by the monitored environment that provides a view on performance data in the context of the various tiers that participate in processing a particular request. That is, a business transaction, which may be identified by a unique business transaction identification (ID), represents the end-to-end processing path used to fulfill a service request in the monitored environment (e.g., adding items to a shopping cart, storing information in a database, purchasing an item online, etc.). Thus, a business transaction is a type of user-initiated action in the monitored environment defined by an entry point and a processing path across application servers, databases, and potentially many other infrastructure components. Each instance of a business transaction is an execution of that transaction in response to a particular user request (e.g., a socket call, illustratively associated with the TCP layer). A business transaction can be created by detecting incoming requests at an entry point and tracking the activity associated with request at the originating tier and across distributed components in the application environment (e.g., associating the business transaction with a 4-tuple of a source IP address, source port, destination IP address, and destination port). A flow map can be generated for a business transaction that shows the touch points for the business transaction in the application environment. In one embodiment, a specific tag may be added to packets by application specific agents for identifying business transactions (e.g., a custom header field attached to a hypertext transfer protocol (HTTP) payload by an application agent, or by a network agent when an application makes a remote socket call), such that packets can be examined by network agents to identify the business transaction identifier (ID) (e.g., a Globally Unique Identifier (GUID) or Universally Unique Identifier (UUID)). Performance monitoring can be oriented by business transaction to focus on the performance of the services in the application environment from the perspective of end users. Performance monitoring based on business transactions can provide information on whether a service is available (e.g., users can log in, check out, or view their data), response times for users, and the cause of problems when the problems occur.

In accordance with certain embodiments, the observability intelligence platform may use both self-learned baselines and configurable thresholds to help identify network and/or application issues. A complex distributed application, for example, has a large number of performance metrics and each metric is important in one or more contexts. In such environments, it is difficult to determine the values or ranges that are normal for a particular metric; set meaningful thresholds on which to base and receive relevant alerts; and determine what is a "normal" metric when the application or infrastructure undergoes change. For these reasons, the disclosed observability intelligence platform can perform anomaly detection based on dynamic baselines or thresholds, such as through various machine learning techniques, as may be appreciated by those skilled in the art. For example, the illustrative observability intelligence platform herein may automatically calculate dynamic baselines for the monitored metrics, defining what is "normal" for each metric based on actual usage. The observability intelligence platform may then use these baselines to identify subsequent metrics whose values fall out of this normal range.

In general, data/metrics collected relate to the topology and/or overall performance of the network and/or application (or business transaction) or associated infrastructure, such as, e.g., load, average response time, error rate, percentage CPU busy, percentage of memory used, etc. The controller UI can thus be used to view all of the data/metrics that the agents report to the controller, as topologies, heatmaps, graphs, lists, and so on. Illustratively, data/metrics can be accessed programmatically using a Representational State Transfer (REST) API (e.g., that returns either the JavaScript Object Notation (JSON) or the extensible Markup Language (XML) format). Also, the REST API can be used to query and manipulate the overall observability environment.

Those skilled in the art will appreciate that other configurations of observability intelligence may be used in accordance with certain aspects of the techniques herein, and that other types of agents, instrumentations, tests, controllers, and so on may be used to collect data and/or metrics of the network(s) and/or application(s) herein. Also, while the description illustrates certain configurations, communication links, network devices, and so on, it is expressly contemplated that various processes may be embodied across multiple devices, on different devices, utilizing additional devices, and so on, and the views shown herein are merely simplified examples that are not meant to be limiting to the scope of the present disclosure.

——Web Tokens for Enhanced Microservice Observability——

As noted above, microservices provide applications, for example, distributed web or business applications, access to independent components that run processes as services (e.g., over an application programming interface (API)). Due to their independent nature, microservices can be updated, deployed, and scaled to meet demand for a plurality of applications. Examples of services that a microservice may offer may include payment processing, product/service tracking, file/data access, comment posting on a website, etc. Oftentimes, microservices are employed at an application layer (e.g., by a web application or a distributed business application at a "mid-tier").

Due to how microservice and web application interoperability is implemented, these components conventionally communicate authentication information. For example, a web application may send a JSON web token comprising authentication information (e.g., about an end user) to a microservice so that the microservice may, after verifying the information, use this information to perform a service, process, etc. In another example, a microservice may merely repackage a received token that has authentication information and send it to another microservice. Furthermore, network elements, responsible for carrying internet traffic, including traffic for web applications and microservices, lack visibility into information communicated among these components. This is largely due to network elements operating in a different communication layer (e.g., network layer vs. application layer). Consequently, these network elements are incapable of applying differentiated policies that could potentially be based on such visibility.

The techniques herein, therefore, provide mechanisms to enable enhanced microservice and network element observability. Notably, as described in greater detail below, web applications and microservices (and other components) may be enabled to use JSON web tokens for more than communication of authentication information related to a particular web application transaction. In particular, web applications and microservices may be configured to obtain, identify, or determine observability or security information about a microservice, web transaction, distributed web application, etc. As described herein above, this information may include performance information gathered by an application agent, network agent, etc. These web applications and microservices may then include this information, along with authentication information, within JSON web tokens prior to sending the JSON web tokens along network paths to, for example, complete a web application transaction. Alternatively, such as where encryption keys are not shared/known, the web application and microservices may be configured to send a separate JSON web token that is in addition to a conventional web token (that carries authentication information), where the separate JSON web token includes performance information. Both the separate JSON web token and conventional web token may be sent along a same network path (e.g., for a particular web application transaction). The additional performance information may be used by downstream microservices, applications, etc. along the network path to, for example, correlate performance of a particular parts of a web application transaction with devices, locations, etc. Additionally, the performance information may be used to provide additional visibility into performance of a microservice or web application.

In addition, as will be described in greater detail herein below, the techniques herein provide mechanisms to enable transit network elements or devices (e.g., a router, switch, etc.) to perform a service on network traffic based on JSON web token-derived information (that is communicated among web applications and microservices).

Figure 4:
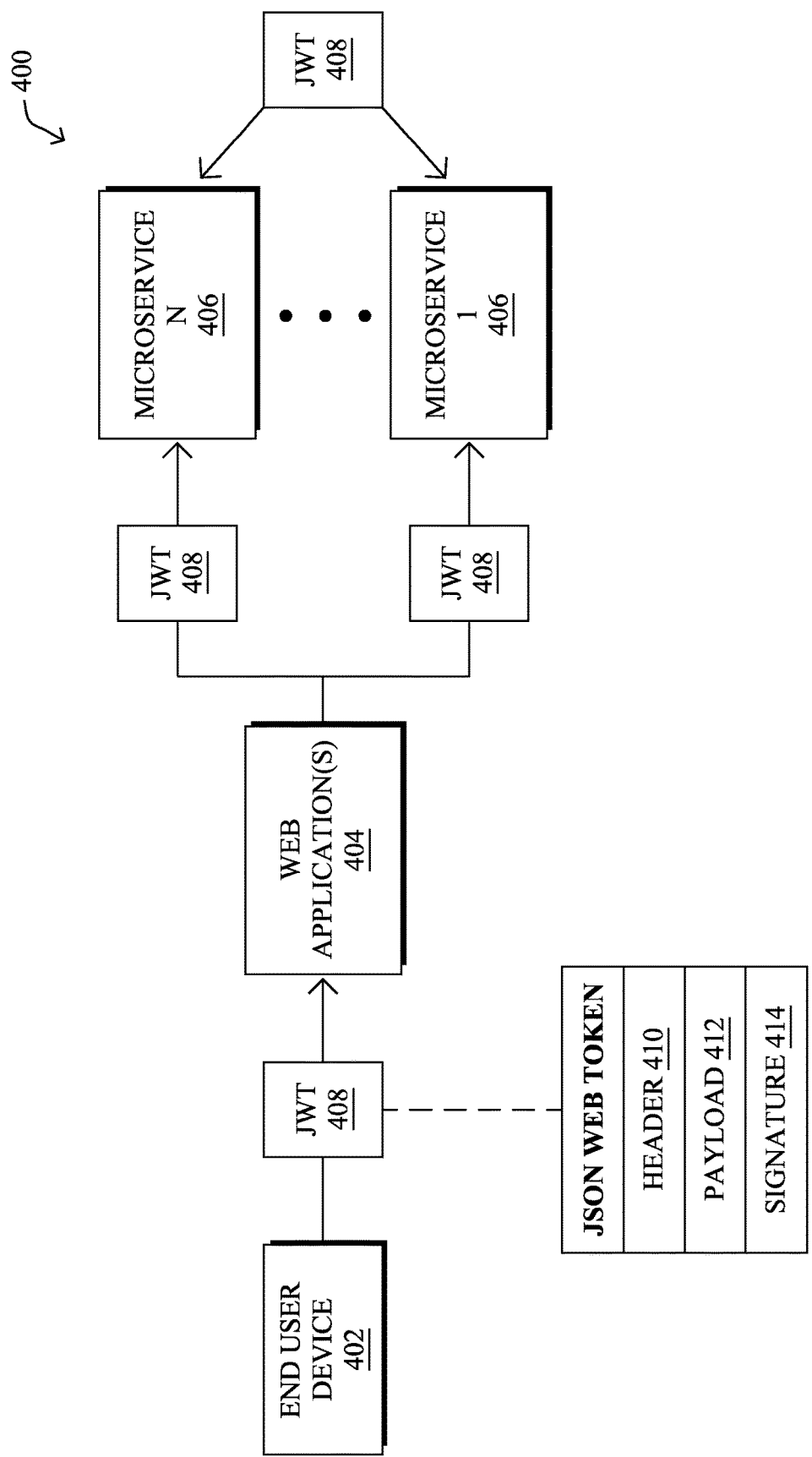
FIG. 4 illustrates an example architecture for web tokens for enhanced microservice observability.

Operationally, FIG. 4 illustrates an example architecture 400 of web tokens for enhanced microservice observability. Architecture 400 may comprise end user device 402, one or more web applications 404, and plurality of microservices 406. Generally, an end user at end user device 402 may use end user device 402 to initiate, complete, participate in, etc. an instance of a web application transaction which one or more web applications 404 is configured to perform. Notably, one or more web applications 404 may comprise a distributed business transaction application. As described herein above, the end user may purchase a good or service via an e-commerce platform, initiate a stock transaction, participate in a social media post or thread, etc., all of which may be understood as a web transaction or a business transaction.

To perform a particular web application transaction (e.g., a distributed business transaction), one or more web applications 404 may leverage one or more microservices offered by plurality of microservices 406. Notably, microservices have become an integral part of the application development and deployment landscape, especially for web applications. Microservices may be understood as providing individual services that are related to or part of a web application transaction, for example, payment processing/tracking, information gathering, supply chain monitoring, data sharing and/or processing, etc.

As shown, one or more JSON web tokens 408, also known as "JWTs", may be communicated among end user device 402, one or more web applications 404, and plurality of microservices 406, where one or more JSON web tokens 408 can be understood as information (or metadata) that is distributed among these components. In particular, JWTs are conventionally used for authentication between one or more web applications 404, and plurality of microservices 406. Notably, authentication using a JWT may include validation of another microservice, a web application, an end user device, etc. to allow these components to interoperate with each other securely. Further, JWTs may be encrypted or standardized (e.g., using standard libraries) and stateless.

As will be described in greater detail herein, JWTs may additionally be used to carry performance information (or metrics) regarding performance, operability, etc. regarding end user device 402, one or more web applications 404, and plurality of microservices 406. Such performance information may be gathered by one or more agents, in addition to microservices 406.

A particular JWT may be carried in an HTTP Authorization header that is encrypted using, for example, secure sockets layer (SSL) or transport layer security (TLS). It is contemplated that the particular JWT may be included in any other header. As shown, a particular JWT of one or more JSON web tokens 408 may be understood as a data structure including three parts (that are readable after decryption), including JWT header 410, JWT payload 412, and JWT signature 414. These parts may be concatenated Base64url-encoded strings that are separated by dots (.).

JWT header 410 may include metadata about a type of token (e.g., a JWT) and one or more cryptographic algorithms used to secure content of a JWT contents. Oftentimes, this information is indicative of a token type and a signing algorithm.

JWT payload 412 may include claims; in other words, verifiable security statements, such as an identity of a user and permissions that the user is allowed. This is often indicated by key-value pairs. This signed information (e.g. supplier, signing authority, subject, etc.) is verified by microservices 406 to determine whether a service, process, etc. offered by microservices 406 is to occur. JWT payload 412 may additionally be configured to include performance information regarding particular transaction offered by one or more web applications 404, along with authentication information.

That is, additional key-value pairs may be included in JWT payload 412 that are indicative of performance metrics, location, statistics, etc. regarding a particular transaction that have been measured by, for example, a microservice, agent, etc. Notably, such performance information may generally include observability (application performance monitoring) and security (runtime application self-protection) information. For example, the information be indicative of: a transaction name, transaction type, a user name associated with a particular transaction, a user login role associated with a particular transaction, authentication status (whether it was performed) type, or level, a number of login failures, a geolocation associated with an end point device (e.g., that initiated a particular transaction), etc. It is contemplated that this information may be used in contexts such as auditing microservice usage, billing, discovery, tracing, extended authentication, enhanced security, etc. Example custom claims could be: "performed-mfa: yes", "geolocation: bos", "username:username", etc.

JWT signature 414 may include a signature that is used to validate a particular JWT, where validation is indicative of a token's trustworthiness. That is, the signature may be used to determine whether a token has been tampered with.

Generally, two keys are associated with a particular JWT, a public key and a private key. A public key is used by one or more web applications 404 and microservices 406 for decrypting and verifying contents of a particular JWT (that has been signed). A private key is used to encrypt and/or sign a particular JWT (i.e., which prevents it from being modified). Obtaining a private key for a particular JWT may comprise communicating with one or more authorization servers (e.g., Auth0™) that provide access to the private key or to provide a service for signing a JWT. Furthermore, it is contemplated, one or more signing authority certificates, used for signing a JWT, may be stored locally (i.e., on a same device, part of memory, etc. as one or more web applications 404 or microservices 406). For example, exemplary instructions (or code) for obtaining a public key and private key from a certificate imported from a key store may comprise:

```
private void setKeys( ) throws Exception
{
FileInputStream fis=new FileInputStream("jwt.jks");
KeyStore keystore=KeyStore.getInstance(KeyStore.getDefaultType( ));
keystore.load(fis, "jkspassword".toCharArray( ));
key=keystore.getKey("jwtkey", "keypassword".toCharArray( ));
Certificate cert=keystore.getCertificate("jwtkey");
publicKey=cert.getPublicKey( )
}
```

In some embodiments, it is contemplated that an existing JWT, used for authentication, may be supplemented with the additional performance information described above. Particularly, instrumentation may be implemented as part of one or more web applications 404 or plurality of microservices 406, where the instrumentation "adds" performance information to the existing JWT claims used for authentication. Generally, this may be desired in asymmetric authorization scenarios, where a private key is accessible that allows the existing JWT to be cloned, modified (with the performance information), and signed with a private key.

Alternatively, it is contemplated that a private key related to a particular transaction is not available, and in such scenarios, an additional JWT may be generated (e.g., by one or more web applications 404 or microservices 406) that includes performance information. The additional JWT may be sent in addition to an existing JWT (that carries authentication information). Of note, if a private key for an existing JWT is inaccessible (e.g., in a "Authorization: Bearer" HTTP header), another header may be used for the additional JWT, where one or more signed trusted authority certificates may be used for signing the additional JWT. It is contemplated that the additional JWT may or may not be signed with a key (i.e., in scenarios where Hypertext Transfer Protocol Secure (HTTPS) is relied on for encryption).

In either case of performance metrics being included in a repackaged existing JWT or in an additional JWT, both these JWTs may be sent to downstream components, for example, a microservice from microservices 406 or application from one or more web applications 404, where the downstream components may obtain visibility into a particular web transaction based on the performance metrics. That is, downstream components along a network path (of particular web transaction) may correlate performance of a particular parts of a web application transaction with devices, locations, etc. Additionally, the performance information may be used to provide additional visibility into performance of a microservice or web application, using any of the monitoring techniques described herein above. That is, one or more agents, as described herein, may be configured to monitor microservices 406 based on performance information or metrics included in enhanced JWTs or additional JWTs. Particularly, using instrumentation and/or monitoring techniques described herein, information (e.g., metrics, observations, etc.) may be gathered by the one or more agents, where such information may be used to monitor the presence, performance, statistics, etc. of processes performed by a particular application (e.g., a business application) as well as associated microservices.

According to one or more additional embodiments of the present disclosure, the techniques herein further provide mechanisms to use JSON web tokens for microservice visibility and associated network policy application, particularly on network devices not conventionally configured to view/process JWTs. As noted above, that is, JWTs do not provide visibility for network devices in that they are oftentimes only used for facilitating communication among applications and their associated microservice components. Network devices (e.g., switches, routers, etc.) typically lack the ability to dig deep enough into any transiting data traffic to read such JWTs. For example, even flexible, programmable application-specific integrated circuits (ASICs) found in network devices are conventionally incapable of looking deeper than 128 bytes into a particular data packet, which is not deep enough to have visibility into JWT information. Without such visibility, differentiated policies for different microservices, and metadata signaled by those microservices, is not possible.

According to certain embodiments herein, therefore, a messaging system may generally be implemented such that information from one or more JSON web tokens may be shared with devices/components at networking layer level, despite the encryption that may be associated with the JSON web tokens. To this end, information may be extracted, and optionally derived, from JSON web tokens for a web application transaction, then included in layer-4 (L4) packet headers. The extracted information may enable microservice-level visibility for network devices that conventionally do not have access to this information. The network devices may use this information for policy-based controls (e.g., data path processing) over microservice traffic flows (that are related to the extracted information). In so doing, the techniques herein extend policy and visibility capabilities at a microservice/web application level (i.e., under the auspices and control of data insertable by operators or organizations that manage the JSON web tokens).

In other words, device, components, etc. that are downstream (or upstream) from applications/microservices (which communicate using JWTs) may perform actions based on information, performance, etc. of the applications/microservices. Thus, by embedding JWT-derived metadata into packet headers, network visibility and policy application services may be implemented with microservice-level granularity over network devices (or nodes). Organizations may, then, be provided with the ability to have visibility and control over applications at a microservices level, anywhere desired within network infrastructures of the organizations.

Figure 5:
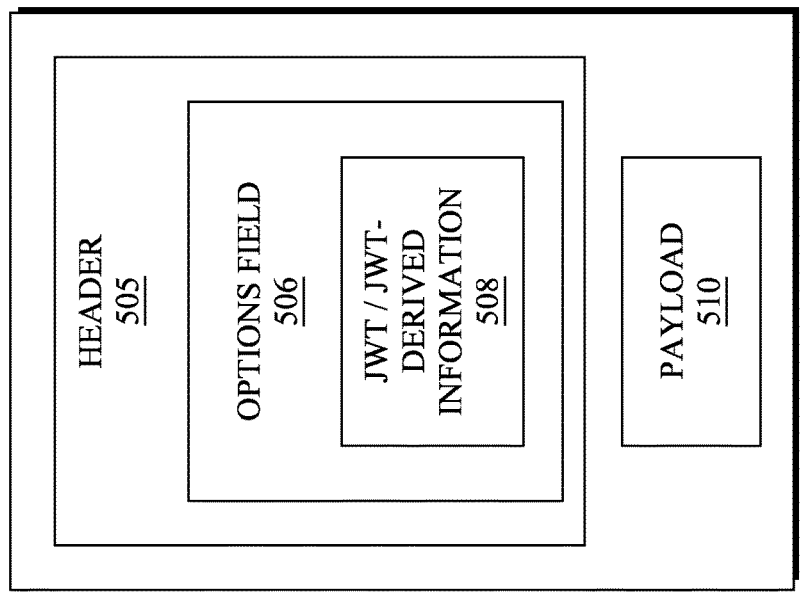
FIG. 5 illustrates an example data packet that includes JWT-derived information.

Operationally, FIG. 5 illustrates an example data packet 500 that includes JWT-derived information. It is to be understood that data packet 500 may be communicated among one or more network devices (e.g., routers, switches, etc.), for example, during the course of their expected operation. In particular, data packet 500 may comprise a header 505 and a payload 510, which one or more network resources, as understood in the art, may use to process, forward, etc. data packet 500 (e.g., parse through header 505 to determine whether and how to process information in payload 510). As shown, header 505 may include options field 506, where JWT/JWT-derived information 508 obtained from JWT payload 412 (e.g., specific key-value claims) may be included. That is, a microservice (e.g., from microservices 406) may be configured to securely and selectively embed JWT-derived data elements into options field 506 of data packet 500 as JWT/JWT-derived information 508. Options field 506 may be understood as flexible field within a standard header (e.g., a TCP header). As will be described in greater detail herein below, one or more network devices may be configured to read, authenticate, and act upon options field 506 with corresponding local device policies. Such local device policies may include:

remarking Differentiated Services Code Point (DSCP) for Quality of Service (QoS) that allows microservice-level traffic handling differentiation);

recording and exporting network flow information that may include information gathered at a microservice level, where the network flow information may be used for microservice tracing;

re-directing network traffic with microservice-level granularity over defined paths in a network;

recording duplicated packet streams (e.g., using an encapsulated remote switched port analyzer (ERSPAN) with microservice-level granularity that may be used for analysis and troubleshooting); or restricting microservice-level traffic flows to defined network perimeters (i.e., access-control lists (ACLs) at a microservice level).

Data packet 500 may be received by one or more network devices that are downstream or upstream from a microservice that generated data packet 500 (that includes an options field 506 that includes JWT-derived information). The one or more network devices may comprise high-speed network devices (e.g., routers, switches, etc.).

FIG. 6 illustrates an example TCP header 600 that includes JWT-derived information. Particular, TCP header 600 may be for IPv4, IPv6, etc. and may comprise a TCP Options field 602. TCP Options field 602 may be exported via an application such as Flexible NetFlow so that network platforms (e.g., Stealthwatch™, Cisco™ DNA Center, etc.) may monitor, analyze, trace microservice flows across a network or security infrastructures.

As shown, TCP header 600 occurs 20 bytes into an IPv4 packet, meaning that TCP Options field 602 occurs 40 bytes into the IPv4 packet (and may be up to 40 bytes long). This total of 80 bytes to the end of the TCP Options header is this well within the first-128-bytes limit of many common flexible forwarding ASICs in terms of parsing. Therefore, it may be accessed by network devices using such ASICs. In the case of IPv6, the TCP Options field 602 starts at 60 bytes into the packet header (40 byte IPv6 header plus 20-byte TCP header), for a total of 100 bytes, which is well within the parsing capabilities of ASICs.

TCP Options field 602 may include JWT-derived information that may be flexibly be defined by one or more web applications 404 or microservices 406. It is contemplated that standards may be established for establishing how one or more network devices are to parse, read, etc. TCP Options field 602 for application of one or more networking policies. In scenarios where visibility and microservice-level network tracing are desired, recording and exporting JWT-derived information of TCP Options field 602, along with an associated flow data, may be sufficient.

In other scenarios, interpretation of the JWT-derived information by one or more network devices may be necessary, for example, rewriting DSCP values or performing traffic steering/recording with microservice-level granularity. This may be facilitated by using pre-established data formats that applications, microservices, and network devices are configured to read and act upon. For example, such formats could be expressed centrally and propagated to network nodes using, for example, Network Configuration Protocol (NETCONF) or a Yang data model. The network nodes may then be configured to recognize and act upon these formats for packet recognition and associated policy application. It is contemplated that visibility of JWT-derived information in TCP Options field 602 may extend into a greater level of traceability, troubleshooting, etc. for assessing a user level experience and service level performance. For example, visibility may be provided into a particular web application, service communication characteristics, resources (such as buffers, packet schedulers, SAR functions, L2 and L3 hashing) that are impacted.

It is contemplated that TCP Options field 602 may be verifiable, (e.g., added into TCP header 600 by a "trusted source") to ensure against tampering, modification, etc. This may be accomplished via the use of the use of one or more digital signatures that are included in TCP Options field 602, for example, by using a mechanism such as secure hash algorithm-256 (SHA-256). Such a digital signature may be processed network devices.

In some scenarios, SHA-256 may consume too much space in TCP header 600 due to a standard SHA-256 signature typically comprising 32 bytes (of 40 bytes of TCP header 600). This may be addressed by computation of a full SHA-256 (or other) digital signature on the entirety of JWT-derived information that may be included in TCP Options field 602. The resulting digital signature may then be truncated, where only a truncated portion of resulting digital signature is included in the TCP Options field 602. For example, computing a full 32-byte digital signature followed by truncating it and including a last 96 (or 128 bits) of this signature in the TCP Options field 602 may provide significant protection (e.g., from tampering). Such example would still leave 28 (or 24) bytes of space for JWT-derived information.

Figure 7:
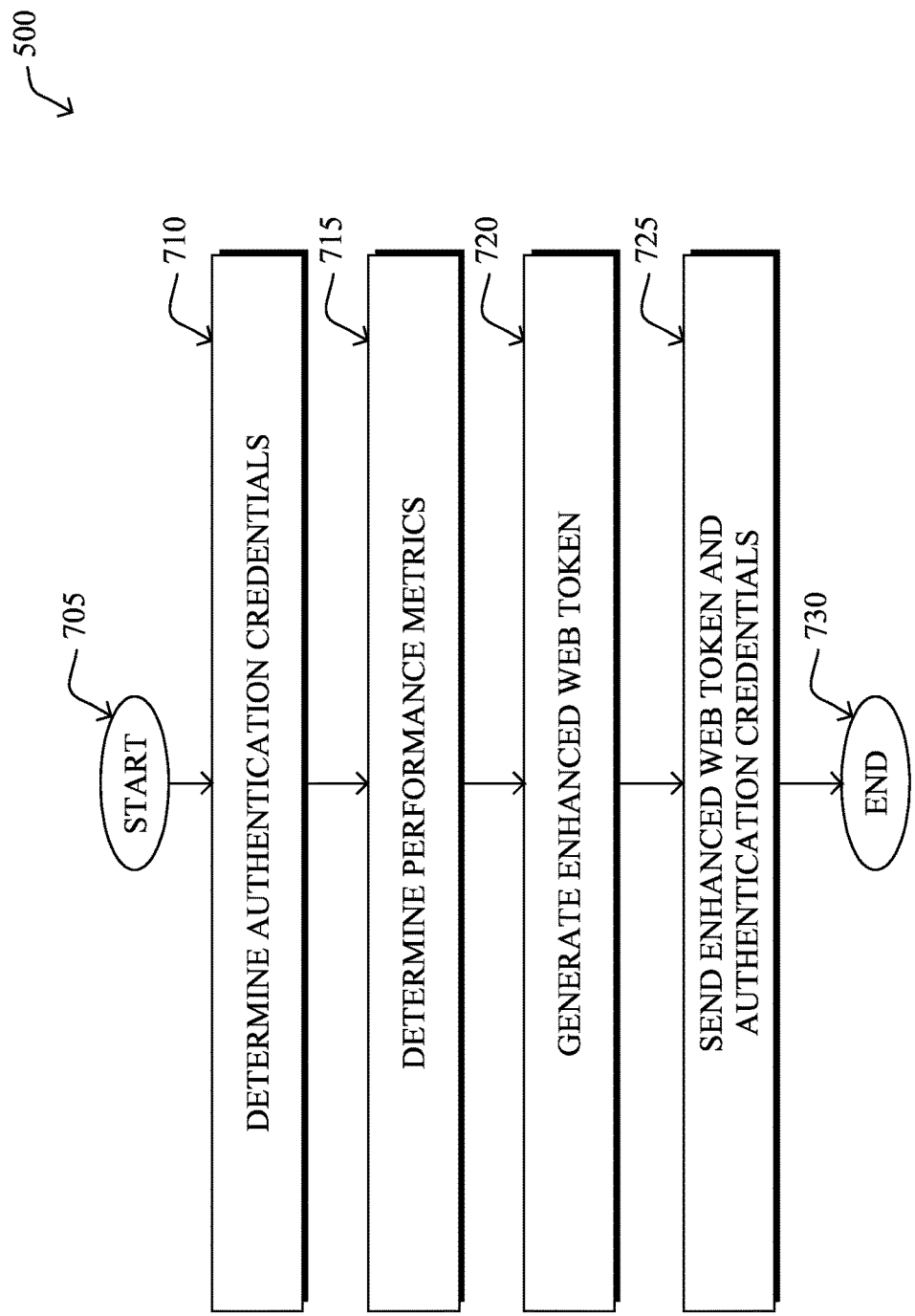
FIGS. 7-8 illustrate example simplified procedures for web tokens for enhanced microservice observability in accordance with one or more embodiments described herein.

In closing, FIG. 7 illustrates an example simplified procedure for web tokens for enhanced microservice observability in accordance with one or more embodiments described herein, particularly from the perspective of either an edge device or a controller. For example, a non-generic, specifically configured device (e.g., device 200) may perform procedure 700 by executing stored instructions (e.g., process 248). The procedure 700 may start at step 705, and continues to step 710, where, as described in greater detail above, a service may determine authentication credentials for a web application transaction. In some embodiments, the service may be selected from a group consisting of: a web application and a microservice application.

At step 715, the service may determine one or more performance metrics regarding the web application transaction. In some embodiments, the one or more performance metrics regarding the web application transaction may be selected from a group consisting of: a transaction name; a transaction type; a username; a user login role; a multifactor authentication indicator; a number of login failures; and a geolocation. In one or more embodiments, the one or more performance metrics may be obtained by one or more agents configured to monitor the web application transaction.

At step 720, the service may generate an enhanced web token comprising the one or more performance metrics regarding the web application transaction.

At step 725, the service may send the enhanced web token and the authentication credentials along a path of the web application transaction, the path including one or more services configured to use the one or more performance metrics sent in addition to the authentication credentials to process the web application transaction. In some embodiments, the authentication credentials may be included in the enhanced web token. In one or more embodiments, the authentication credentials may be sent as part of a web token separate from the enhanced web token.

The simplified procedure 700 may then end in step 730, notably with the ability to continue communicating enhanced web tokens among one or more web applications, microservices, or monitoring agents. Other steps may also be included generally within procedure 700. For example, such steps (or, more generally, such additions to steps already specifically illustrated above), may include: receiving, by the service, a web token comprising the authentication credentials for the web application transaction; and so on. In some embodiments, the enhanced web token may be signed using a private key associated with the web token. In one or more embodiments, the enhanced web token may be signed using a trusted authority certificate.

Figure 8:
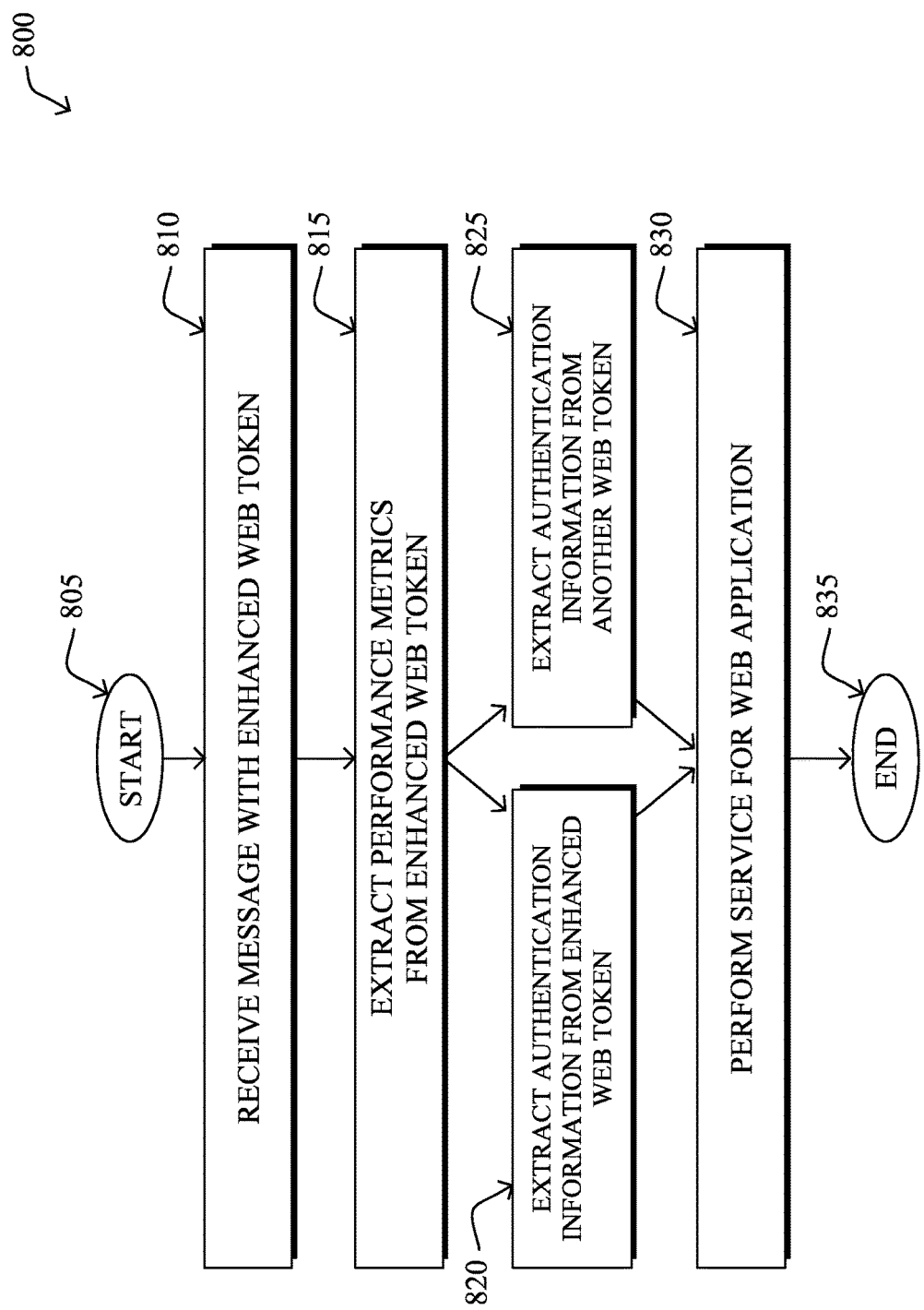

FIG. 8 illustrates another example simplified procedure for web tokens for enhanced microservice observability in accordance with one or more embodiments described herein, particularly from the perspective of either an edge device or a controller. For example, a non-generic, specifically configured device (e.g., device 200) may perform procedure 800 by executing stored instructions (e.g., process 248). The procedure 800 may start at step 805, and continues to step 810, where, as described in greater detail above, a process may receive a message regarding a web application transaction, wherein the message comprises an enhanced web token. In some embodiments, the message may be received from a service that is selected from a group consisting of: a web application and a microservice application.

At step 815, the process may extract one or more performance metrics regarding the web application transaction from the enhanced web token. In some embodiments, the one or more performance metrics regarding the web application transaction may be selected from a group consisting of: a transaction name; a transaction type; a username; a user login role; a multifactor authentication indicator; a number of login failures; and a geolocation.

At step 820, the process may extract, when the enhanced web token comprises authentication information regarding the web application transaction, the authentication information from the enhanced web token. At step 825, alternatively, the process may extract, when the enhanced web token does not comprise the authentication information regarding the web application transaction, the authentication information regarding the web application transaction from another web token.

At step 830, the process may perform a service for the web application transaction based on the one or more performance metrics. In some embodiments, the service for the web application transaction may comprise generating a header of a data packet that one or more network devices are configured to process, further wherein the header may include information derived from one or more performance metrics. In one or more embodiments, wherein the data packet may comprise a transmission control protocol packet, further wherein the information derived from one or more performance metrics may be included in an options field.

The simplified procedure 800 may then end in step 835, notably with the ability to continue processing messages comprising enhanced web tokens that may include JWT-derived information. Other steps may also be included generally within procedure 800.

It should be noted that while certain steps within procedures 700-800 may be optional as described above, the steps shown in FIGS. 7-8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 700-800 are described separately, certain steps from each procedure may be incorporated into each other procedure, and the procedures are not meant to be mutually exclusive.

The techniques described herein, therefore, provide for web tokens for enhanced microservice observability. In particular, the techniques herein leverage JSON web tokens for more than mere communication of authentication information. Notably, web applications and microservices may be configured to obtain, identify, or determine observability or security information about a microservice, web transaction, distributed web application, etc. and include this information (e.g., as key-value claims) in "enhanced" JSON web tokens. Devices, components, etc. that obtain these enhanced JSON web tokens may use this information to obtain observability and/or visibility. Additionally, the techniques herein extend policy and visibility capabilities at a microservice/web application level to network devices by including JWT-derived in data packets communicated by the network devices. These network devices may then implement policy-based controls (e.g., data path processing) over microservice traffic flows (that are related to the extracted information).

In still further embodiments of the techniques herein, a business impact of one or more performance metrics contained within the JWTs or JWT-derived information within TCP headers can also be quantified. That is, because of issues related to specific microservices/applications/processes (e.g., lost traffic, slower servers, overloaded network links, etc.), various corresponding business transactions may have been correspondingly affected for those applications/processes (e.g., online purchases were delayed, page visits were halted before fully loading, user satisfaction or dwell time decreased, etc.), while other processes (e.g., on other network segments or at other times) remain unaffected. The techniques herein, therefore, can correlate the performance metrics with various business transactions in order to better understand the effect on the business transactions, accordingly.

Illustratively, the techniques described herein may be performed by hardware, software, and/or firmware, such as in accordance with the illustrative of microservice observability process 248, which may include computer executable instructions executed by the processor 220 to perform functions relating to the techniques described herein, e.g., in conjunction with corresponding processes of other devices in the computer network as described herein (e.g., on network agents, controllers, computing devices, servers, etc.). In addition, the components herein may be implemented on a singular device or in a distributed manner, in which case the combination of executing devices can be viewed as their own singular "device" for purposes of executing the process 248.

According to the embodiments herein, an illustrative method herein may comprise: determining, at a service, authentication credentials for a web application transaction; determining, by the service, one or more performance metrics regarding the web application transaction; generating, by the service, an enhanced web token comprising the one or more performance metrics regarding the web application transaction; and sending, by the service, the enhanced web token and the authentication credentials along a path of the web application transaction, the path including one or more services configured to use the one or more performance metrics sent in addition to the authentication credentials to process the web application transaction. In one embodiment, the service may be selected from a group consisting of: a web application and a microservice application. In one embodiment, the one or more performance metrics regarding the web application transaction may be selected from a group consisting of: a transaction name; a transaction type; a username; a user login role; a multifactor authentication indicator; a number of login failures; and a geolocation. In one embodiment, the one or more performance metrics may be obtained by one or more agents configured to monitor the web application transaction. In one embodiment, the method may further comprise: receiving, by the service, a web token comprising the authentication credentials for the web application transaction. In one embodiment, the enhanced web token may be signed using a private key associated with the web token. In one embodiment, the enhanced web token may be signed using a trusted authority certificate. In one embodiment, the authentication credentials may be included in the enhanced web token. In one embodiment, the authentication credentials may be sent as part of a web token separate from the enhanced web token According to the embodiments herein, an illustrative tangible, non-transitory, computer-readable medium herein may have computer-executable instructions stored thereon that, when executed by a processor on a computer, may cause a service of the computer to perform a method comprising: determining authentication credentials for a web application transaction; determining one or more performance metrics regarding the web application transaction; generating an enhanced web token comprising the one or more performance metrics regarding the web application transaction; and sending the enhanced web token and the authentication credentials along a path of the web application transaction, the path including one or more services configured to use the one or more performance metrics sent in addition to the authentication credentials to process the web application transaction.

Further, according to the embodiments herein an illustrative apparatus herein may comprise: one or more network interfaces to communicate with a network; a processor coupled to the network interfaces and configured to execute one or more processes; and a memory configured to store a process that is executable by the processor, the process, when executed, configured to: determine authentication credentials for a web application transaction; determine one or more performance metrics regarding the web application transaction; generate an enhanced web token comprising the one or more performance metrics regarding the web application transaction; and send the enhanced web token and the authentication credentials along a path of the web application transaction, the path including one or more services configured to use the one or more performance metrics sent in addition to the authentication credentials to process the web application transaction.

While there have been shown and described illustrative embodiments above, it is to be understood that various other adaptations and modifications may be made within the scope of the embodiments herein. For example, while certain embodiments are described herein with respect to certain types of networks in particular, the techniques are not limited as such and may be used with any computer network, generally, in other embodiments. Moreover, while specific technologies, protocols, and associated devices have been shown, such as Java, TCP, IP, and so on, other suitable technologies, protocols, and associated devices may be used in accordance with the techniques described above. In addition, while certain devices are shown, and with certain functionality being performed on certain devices, other suitable devices and process locations may be used, accordingly. That is, the embodiments have been shown and described herein with relation to specific network configurations (orientations, topologies, protocols, terminology, processing locations, etc.). However, the embodiments in their broader sense are not as limited, and may, in fact, be used with other types of networks, protocols, and configurations.

Moreover, while the present disclosure contains many other specifics, these should not be construed as limitations on the scope of any embodiment or of what may be claimed, but rather as descriptions of features that may be specific to particular embodiments of particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Further, although features may be described above as acting in certain combinations and even initially claimed as such, one or more features from a claimed combination can in some cases be excised from the combination, and the claimed combination may be directed to a sub-combination or variation of a sub-combination.

For instance, while certain aspects of the present disclosure are described in terms of being performed "by a server" or "by a controller" or "by a microservice", those skilled in the art will appreciate that agents of the observability intelligence platform (e.g., application agents, network agents, language agents, etc.) may be considered to be extensions of the server (or controller/engine) operation, and as such, any process step performed "by a server" need not be limited to local processing on a specific server device, unless otherwise specifically noted as such. Furthermore, while certain aspects are described as being performed "by an agent" or by particular types of agents (e.g., application agents, network agents, endpoint agents, enterprise agents, cloud agents, etc.), the techniques may be generally applied to any suitable software/hardware configuration (libraries, modules, etc.) as part of an apparatus, application, or otherwise.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method, comprising:
receiving, by a service, a web token comprising authentication credentials for a web application transaction;
determining, at the service, the authentication credentials for the web application transaction;
determining, by the service, one or more performance metrics regarding the web application transaction, wherein the one or more performance metrics comprise observability information associated with the web application transaction and security information associated with extended authentication or enhanced security;
generating, by the service and based on the web token, an enhanced web token by adding claims in an options field of a header of the web token, the claims comprising the one or more performance metrics regarding the web application transaction; and
sending, by the service, the enhanced web token and the authentication credentials along a network path of the web application transaction, the network path including one or more services or microservices configured to use the one or more performance metrics sent in addition to the authentication credentials to monitor and process the web application transaction.

2. The method as in claim 1, wherein the service is selected from a group consisting of: a web application and a microservice application.

3. The method as in claim 1, wherein the one or more performance metrics regarding the web application transaction are selected from a group consisting of: a transaction name; a transaction type; a username; a user login role; a multifactor authentication indicator; a number of login failures; and a geolocation.

4. The method as in claim 1, wherein one or more agents, configured to monitor the web application transaction, obtain the one or more performance metrics.

5. The method as in claim 1, wherein the enhanced web token is signed using a private key associated with the web token.

6. The method as in claim 1, wherein the enhanced web token is signed using a trusted authority certificate.

7. The method as in claim 1, wherein the authentication credentials are included in the enhanced web token.

8. The method as in claim 1, wherein the authentication credentials are sent as part of a web token separate from the enhanced web token.

9. A tangible, non-transitory, computer-readable medium having computer-executable instructions stored thereon that, when executed by a processor on a computer, cause a service of the computer to perform a method comprising:

receiving a web token comprising authentication credentials for a web application transaction;

determining authentication credentials for a web application transaction;

determining one or more performance metrics regarding the web application transaction, wherein the one or more performance metrics comprise observability information associated with the web application transaction and security information associated with extended authentication or enhanced security;

generating, based on the web token, an enhanced web token by adding claims in an options field of a header of the web token, the claims comprising the one or more performance metrics regarding the web application transaction; and sending the enhanced web token and the authentication credentials along a network path of the web application transaction, the network path including one or more services or microservices configured to use the one or more performance metrics sent in addition to the authentication credentials to monitor and process the web application transaction.

10. The tangible, non-transitory, computer-readable medium as in claim 9, wherein the enhanced web token is signed using a key selected from a group consisting of: a private key associated with the web token and trusted authority certificate.

11. The tangible, non-transitory, computer-readable medium as in claim 9, wherein the authentication credentials are included in the enhanced web token.

12. The tangible, non-transitory, computer-readable medium as in claim 9, wherein the authentication credentials are sent as part of a web token separate from the enhanced web token.

* * * * *